(12) United States Patent
Popovic et al.

(10) Patent No.: US 7,149,397 B2
(45) Date of Patent: Dec. 12, 2006

(54) 10/100/1000BASE-T SMALL-FORM-FACTOR-PLUGGABLE MODULE

(75) Inventors: Miodrag Popovic, Sunnyvale, CA (US); Bradley D. Erickson, San Carlos, CA (US); Bruce Weller, San Jose, CA (US); Kenneth Swanson, San Jose, CA (US); Stewart Findlater, Mountain View, CA (US); Chris Desiniotis, Fremont, CA (US); Sandeep Arvind Patel, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 10/794,846

(22) Filed: Mar. 4, 2004

(65) Prior Publication Data

US 2005/0196119 A1    Sep. 8, 2005

(51) Int. Cl.
*G02B 6/00* (2006.01)
*H04Q 11/00* (2006.01)
(52) U.S. Cl. .................. 385/134; 370/366; 709/224
(58) Field of Classification Search ................ 709/227; 370/366
See application file for complete search history.

(56) References Cited

U.S. PATENT DOCUMENTS

2004/0246953 A1 * 12/2004 Muth et al. .................. 370/366

OTHER PUBLICATIONS

CISCO Systems, Inc., "Serial-GMII Specification", 10 pages, retrieved from the Internet : <URL:ftp://ftp-eng.cisco.com/smii/smii.html>.

Marvell, "Marvell Extends Industry Leadership with the Broadest Portfolio of 0.13-Micron CMOS Gigabit Ethernet PHYs, Further Accelerating Gigabit to the Desktop", 3 pages, retrieved from the Internet:  <http://www.marvell.com/press/pressNewsDisplay.do?releaseID=68>.

"Small Form-factor Pluggable (SFP) Transceiver MultiSource Agreement (MSA)", retrieved from the Internet: <http://www.schelto.com/SFP/SFP%20MSA.pdf>.

* cited by examiner

*Primary Examiner*—Frank G. Font
*Assistant Examiner*—Eric Wong
(74) *Attorney, Agent, or Firm*—Charles E. Krueger

(57) ABSTRACT

An SFP module provides either a 1000Base-X or SGMII interface protocol to a host and provides a 1000Base-T media dependent interface (MDI). If the SFP module is coupled a host that only implements the 1000Base-X protocol then the SFP module translates the 1000Base-X protocol to the 1000Base-T protocol so that the host MAC sees the 1000Base-T SFP module as if it were an optical transceiver. If the host implements SGMII then the SFP performs auto-negotiation of speed and communicates with the host implement data transfer at a selected rate, e.g., 10, 100, or 1000 Mbps.

12 Claims, 4 Drawing Sheets

10/100/1000BASE-T SMALL-FORM-FACTOR-PLUGGABLE MODULE

BACKGROUND OF THE INVENTION

The hot-swappable, plug and play, single-port SFP (Small Form-factor Pluggable) module is used in network devices implementing Gigabit over fiber applications. The SFP module also offers several significant advantages over its predecessor, the GBIC (Gigabit Interface Converter), including lower cost, lower power, and smaller size. Thus, with the SFP form factor, fiber Gigabit systems may be developed featuring similar port densities as copper-only systems using RJ-45 connectors.

The Small Form-factor Pluggable (SFP) Transceiver MultiSource Agreements (MSA) document puts forward a specification for the development of optical SFP modules based on IEEE 802.3z, the Gigabit Ethernet Standard. Specifically, the MSA calls out 1000Base-X Physical Coding Sub-layer (PCS) which supports full-duplex binary transmission at 1.25 Gbps over two copper wire-pair SerDes (Serializer/Deserializer). Transmission coding is based on the ANSI Fiber Channel 8B/10B encoding scheme.

1000Base-X makes no provision for running at slower speeds. Thus, network device ports utilizing SFPs are dedicated to operating on fiber links at speeds of 1000 Mbps. However, more than 85% of office space inside buildings is category 5 copper. Thus, ports designed to use optical SFPs can not make use of this existing cabling.

For example, a customer may require a network device, such as a router, having both optical ports for long distance connections and RJ-45 copper ports for connecting to local devices. It is often the case that not all optical ports provided on a router are needed at a given time. However, with conventional SFPs these optical ports cannot be utilized to connect with local devices connected by standard copper cabling or operating at speeds lower than 1000 Mbps. Thus, the customer is not utilizing all the ports on the router thereby leading to inefficient use of network resources.

BRIEF SUMMARY OF THE INVENTION

According to an embodiment of the invention, an SFP module provides a Serial Gigabit Media Independent Interface (SGMII) to the host plus a 10/100/1000Base-T wireline interface to support the numerous Ethernet installations which have copper wiring and networked equipment running at various speeds (10, 100, or 1000 Mbps).

According to another embodiment of the invention, if the host does not implement an SGMII interface then the SFP module provides a 1000Base-X interface to the host and translates between the 1000Base-X and 1000Base-T protocols to provide Gigabit data transfer.

According to another embodiment of the invention, the SFP 1000Base-X interface auto-negotiates to service ports at other than Gigabit data transfer rates.

According to another embodiment of the invention, a management interface is used by the host to read a storage element on the SFP to ascertain whether the SFP provides an SGMII interface. If the SGMII interface is provided then the host communicates with the SFP using the SGMII interface protocol.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
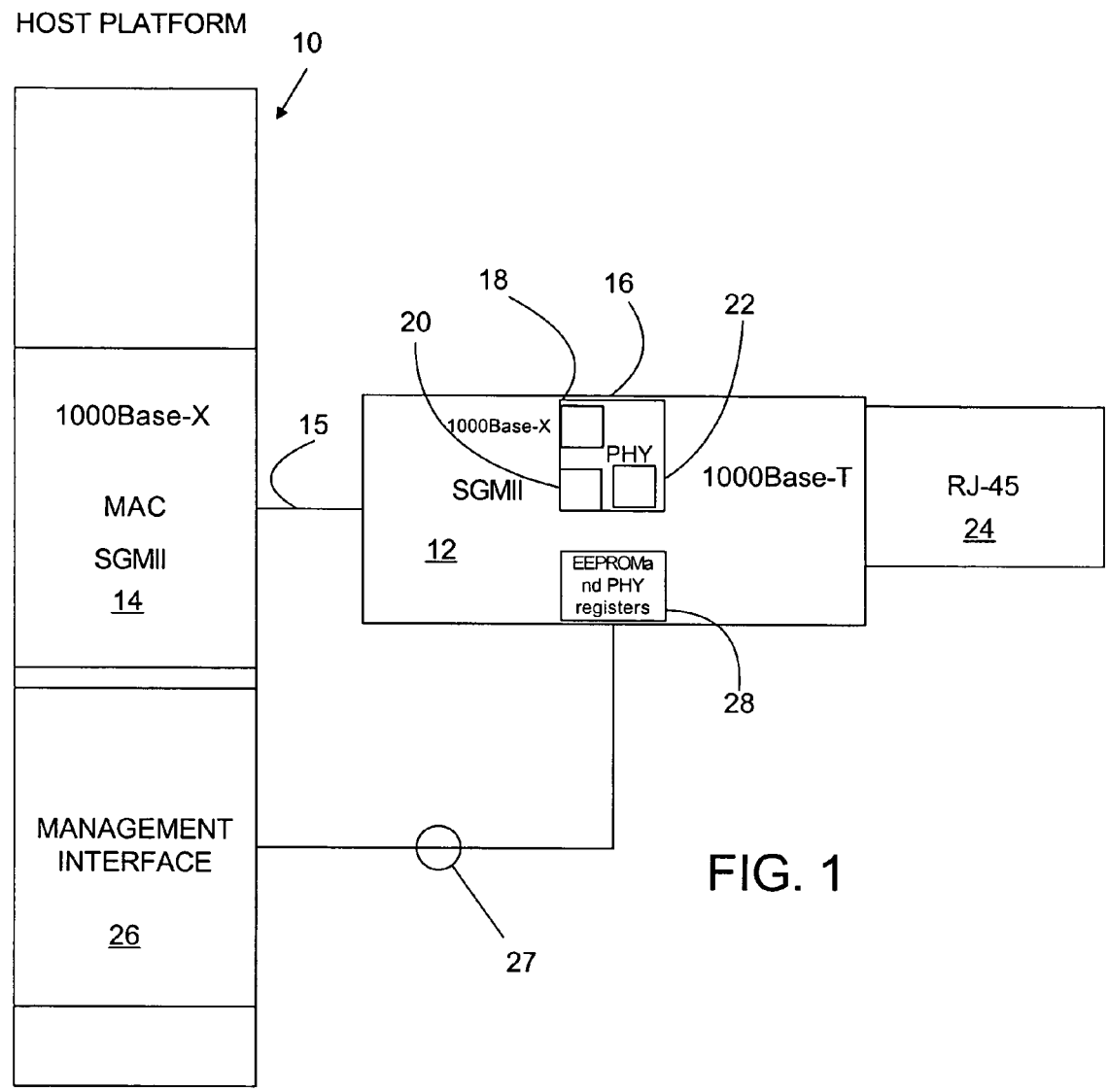
FIG. 1 is a block diagram of an embodiment of the invention.

An embodiment of the invention will now be described with reference to FIG. 1 which depicts a Host 10 and an SFP 12. The Host 10 includes a Media Access Control (MAC) module 14 which may be configured to implement either the 1000Base-X or SGMII interface protocol. The Host and the SFP are coupled by a SERDES interface 15.

The SFP includes an SFP PHY module 16, which is the Ethernet physical level that serializes Ethernet frames and places the serialized frames on a medium, which may be configured to interface with the Host using either the 1000Base-X or SGMII interface protocol 18 or 20 and includes a 1000Base-T media dependent interface (MDI) 22 coupled to an RJ-45 connector 24 using the a 1000Base-T interface protocol.

A management serial interface 26 on the host 10 is a 2-wire serial interface, which provides the access to the SFP EEPROM 28 containing the SFP's ID data, security key and other information, and also provides access to the SFP's PHY registers via a 2-wire bus 27.

As described above, the 1000Base-X interface protocol is designed to utilize SFP modules as connectors to Gigabit optical media. The 1000Base-T interface is designed to provide Gigabit Ethernet utilizing the standard class 5 copper cabling present in most office buildings. 1000Base-T utilizes four class 5 twisted pairs to implement Gigabit Ethernet by sending and receiving a 250 Mbps data stream over each of the four pairs simultaneously (4×250 Mbps=1 Gbps).

Figure 2:
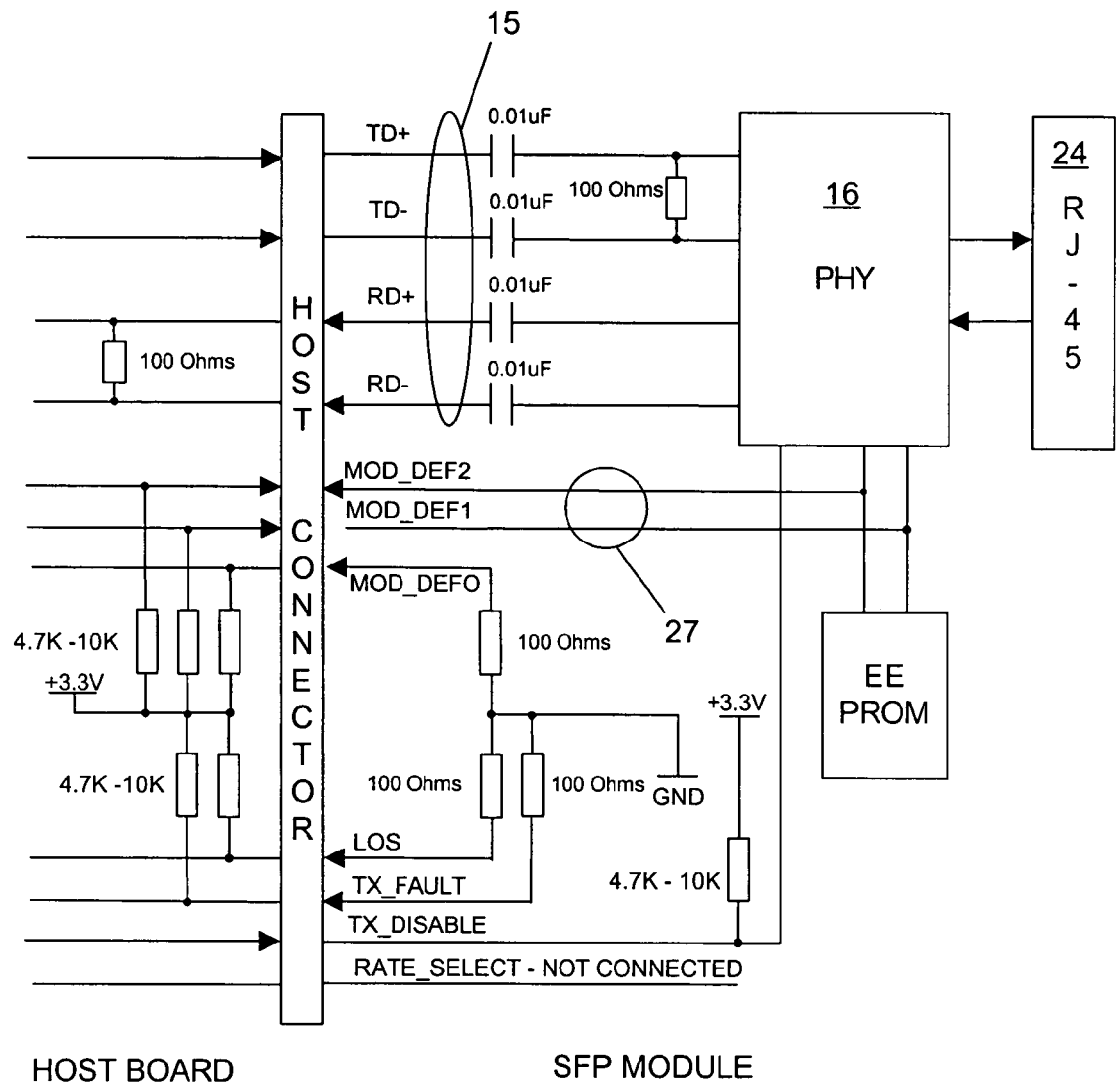
FIG. 2 is a block diagram of a 1000Base-T SFP transceiver.

FIG. 2 depicts the connection between the SFP and the host. The 1000Base-X Physical Coding Sub-layer (PCS) supports full-duplex binary transmission at 1.25 Gbps over a differential SERDES interface 15 comprising two copper wire-pairs TD+, TD−, RD+, and RD−. Transmission coding is based on the ANSI Fiber Channel 8B/10B encoding scheme. The MOD_DEF1 and MOD_DEF1 lines form the 2-wire serial bus 27 connecting the host management interface to the EEPROM and PHY registers on the SFP.

The Host/SFP SERDES interface 15 provides the data transfer over the 1.25 Gbps differential interface to the host board and control and provides configuration functions through the serial management interface. The SERDES PCS (physical coding sub-layer) required for the 1000Base-X protocol is identical to the PCS required for SGMII. Thus, either protocol can be implemented utilizing the same SERDES PCS.

Both the SFP PHY 16 and the MAC 14 on the Host 10 may be configured to implement either the 1000Base-X or the SGMII protocol to communicate over the SERDES link 15. The SFP PHY 16 implements the triple-speed 1000Base-T protocol on the MDI side and includes the functionality for translating between the 1000Base-X and 1000Base-T protocols so that the SFP module of this embodiment can be plugged in to the standard optical port of a router and provides for transparent Autonegotiation between the MAC and the link partner on the copper side using the 1000Base-X protocol. The MAC performs 1000Base-X Autonegotiation and the MAC sees the 1000Base-T SFP transceiver as if it were an optical transceiver.

In one embodiment the SFP PHY 16 additionally includes the functionality of translating between 8b/10b encoding on the host side and 4b/5b encoding. Data encoded in 4b/5b format is compatible with the FDDI and 100Base-X protocols and adds extra flexibility to the system.

Figure 3:
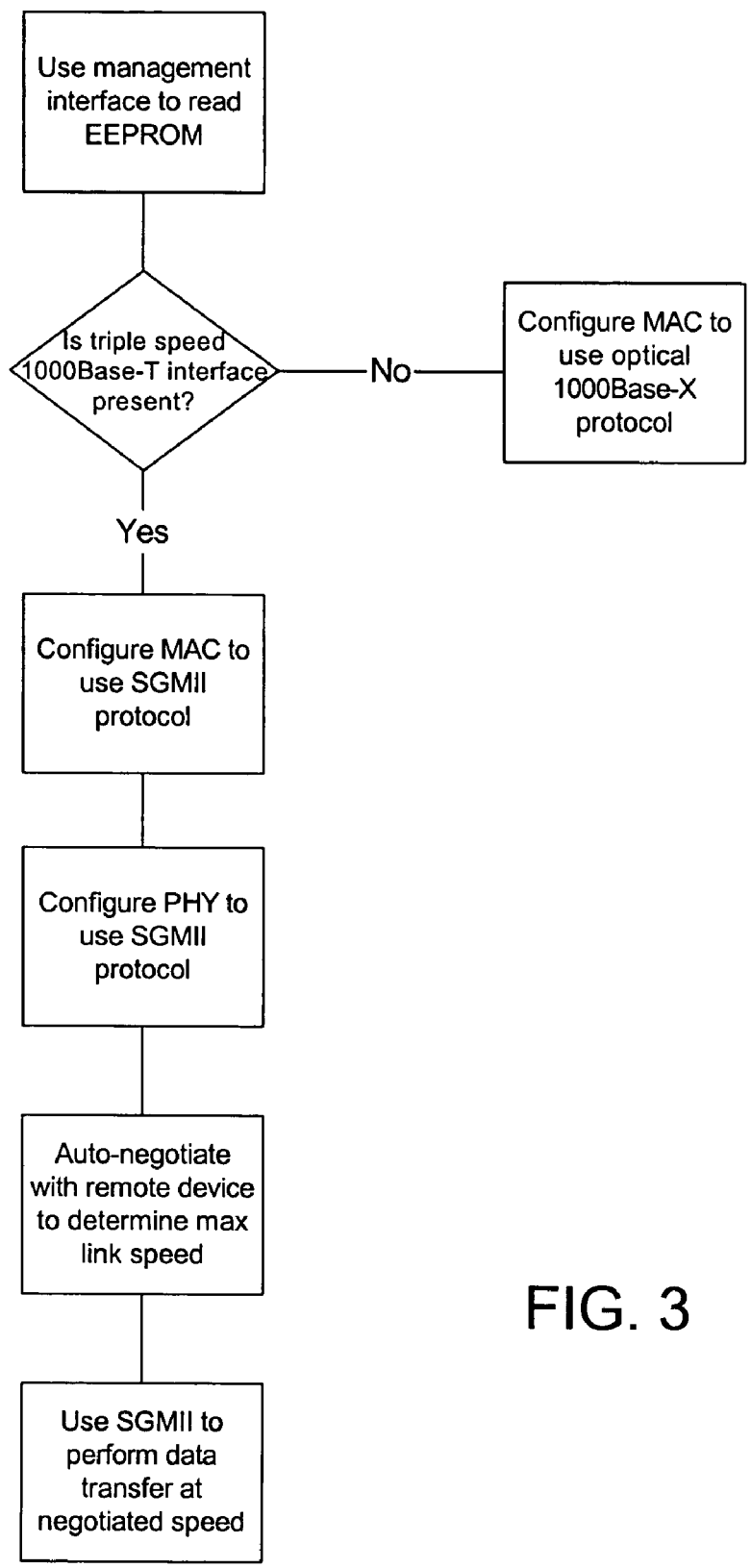
FIG. 3 is a flow chart depicting steps implemented by an embodiment of the invention.

The operation of the embodiment depicted in FIGS. 1 and 2 will now be described with reference to the flow chart of FIG. 3. Upon start-up or reset, the management interface 26 on the Host 10 reads the EEPROM 28 on the SFP 12 to determine the type of SFP present in the port. If a standard optical SFP is in the port the Host configures the MAC 14 to implement the 1000Base-X protocol and communicates over the SERDES interface 15 using this protocol to implement Gigabit Ethernet. The 1000Base-X protocol has no capability to transfer data at a rate other than 1000 Mbps.

In one embodiment, the SFP PHY 16 is coupled to a resistor voltage divider which functions as a hardware strap to force the management interface to default to a speed of 100 Mbps in support for 100Base-FX. At power up, the SFP PHY (master) informs the Host MAC (slave) via in-band SGMII to set speed at data transfer speed at 100 Mnbps. If the management interface determines that the SFP in the port supports a higher data transfer rate it will override the hardware default setting.

Alternatively, at start-up the Host MAC 14 use the management interface and management serial bus 27 to "force" the SFP PHY 16 to speed 100 Mbps at power up. Subsequently, if the management interface determines that the SFP module in the port supports a higher data transfer rate it will override the hardware default setting.

If an SFP utilizing the embodiment described above is present in the port, then the Host 10 configures the MAC 14 to communicate over the SERDES interface 15 utilizing the SGMII protocol and configures the SFP PHY 16 to utilize the SGMII protocol by writing appropriate PHY registers over the management interface bus 27. The default mode of the operation of the SFP is 1000Base-T, full duplex, over SERDES interface. The SGMII protocol operates at 1000 Mbps but has the capacity to transfer data at 10 and 100 Mbps as will be described more fully below.

This method utilizes the SFP to engage in speed autonegotiation. Auto-negotiation is link protocol which automatically selects full or half duplex operation, enables or disables flow control, and selects an operating speed of 10, 100, or 1000 Mbps.

Upon initial connection of a far end PHY, the SFP PHY 16 will autonegotiate speed with a far end PHY in a device coupled to the SFP. The result of this autonegotiation will be communicated back to the Host from the SFP PHY in-band to the SGMII interface. The Host MAC will acknowledge the speed change, resulting in the appropriate connection speed.

As is known in the art, SGMII uses two data signals and two clock signals to convey frame data and link rate information between a 10/100/1000 PHY and an Ethernet MAC. The data signals operate at 1.25 Gbaud and the clocks operate at 625 MHz (a double data rate (DDR) interface). In the SFP application only two differential data signals are used (one in each direction) and the receivers are required to extract the clocks from the data.

Control information signalling data speed is transferred between control registers in the MAC and the SFP PHY. Specifically, bits [11:10] of a 16-bit control register indicate whether the data data transfer rate is 1000 Mbps, 100 Mbps, or 10 Mbps.

Accordingly, the SFP PHY 16 determines the maximum speed of data transfer, either 1000, 100, or 10 Mbps, by performing auto-negotiation with the device at the other end of the link. The SFP PHY 16 then communicates with the MAC utilizing SGMII and performs the data transfer at the auto-negotiated rate.

As stated above, SGMII operates at 1000 Mbps, but the SGMII's 1.25 Gbaud transfer rate is excessive for interfaces operating at 10 or 100 Mbps. When these situations occur, the interface "elongates" the frame by replicating each frame byte 10 times for 100 Mbps and 100 types for 10 Mbps.

The SFP module described above provides for great flexibility and allows a single network port to utilize an SFP coupled to class 5 copper cable to operate transparently with host a implementing only the 1000Base-X Gigabit optical interface and that is also configurable to autonegotiate with slower devices to implement connections at lower speeds such as 10 or 100 Mbps.

The embodiment currently described allows a customer to make full use of his network investment. If optical SFP ports are not required then an SFP configured as described above can be plugged into the port and connected to standard copper cabling to implement the triple-speed 1000Base-T protocol. Thus, these previously unused ports can be put to use to connect to other equipment at the customer's site.

Mechanical

The dimensions of one embodiment of the SFP module are designed to facilitate the close vertical stacking of the SFP ports on the face of a router and to facilitate use in angled SFP ports. This embodiment is depicted in FIG. 4.

With regard to vertical stacking, if SFP modules from two different vendors having opposite RJ-45 orientations are placed in vertically adjacent ports, the tabs on the cable connectors may be too closely spaced and it could be difficult to remove those cables from the SFP module.

Figure 4:
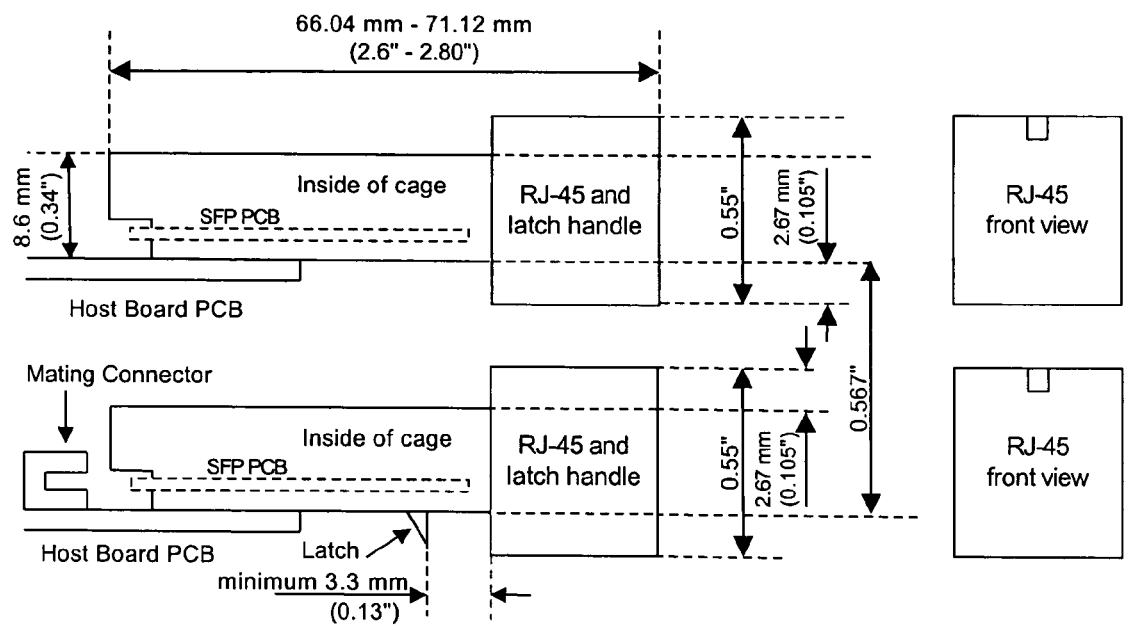
FIG. 4 is side view of an SFP module configured according to an embodiment of the invention.

FIG. 4 depicts a case where two rows of SFP ports are spaced by 0.567 inches. In this embodiment the RJ-45 connector 24 is symmetrically positioned so that equal portions are disposed above and below the SFP cage 40. Also, the RJ-45 release tab 42 is disposed up. Thus, there is no interference caused by modules having different orientations of the RJ-45 connector.

Also, FIG. 4 depicts a minimum distance between the RJ-45 24 and latch shoulder 44 of 3.3 mm. to facilitate their placement in SFP ports angled, in this example, at 20°.

Alternatively, the top and bottom corners of the RJ-45 could be chamfered to compensate for the 20° angle of the SFP ports.

The invention has now been described with reference to the preferred embodiments. Alternatives and substitutions will now be apparent to persons of skill in the art. Accordingly, it is not intended to limit the invention except as provided by the appended claims.

What is claimed is:

1. A Small Form Factor (SFP) module comprising:
a physical layer module having a host-side configurable to communicate with a host using the 1000Base-X protocol or the Serial Gigabit Media Independent Interface (SGMII) protocol and a media dependent interface (MDI) side that communicates utilizing the triple-speed 1000Base-T protocol, that translates between the 1000Base-X and 1000Base-T protocols, and that performs 1000Base-X auto-negotiation to determine a link transmission speed of either 1000, 100, or 10 Mbps;
a storage device holding SFP ID information; and
a management interface, coupled to the storage device and physical layer module, used by a host to read the ID information and, based on the ID information, configure the physical layer module to communicate with the host using either the 1000Base-X protocol or the SGMII protocol.

2. The SFP module of claim 1 further comprising:
a SERDES interface compatible with either the 1000Base-X or SGMII protocols.

3. The SFP module of claim 1 where:
the physical layer module includes configuration registers which are written by the host to configure the physical layer module.

4. An SFP module comprising:
a physical layer module having a host side configurable to communicate with a host using a first or a second protocol, where only the second protocol has the capability of transmitting data at different rates and a media dependent interface (MDI) side that communicates utilizing a third protocol capable of transmitting data over copper cables at different rates, where the physical layer module translates between the first and third protocols, and performs auto-negotiation to determine a preferred data transmission rate;
a storage device holding SFP ID information; and
a management interface, coupled to the storage device and physical layer module, used by the host to read the ID information and, based on the ID information, configure the physical layer to communicate with the host using either the first or second protocol.

5. A method for expanding the functionality of an optical gigabit SFP port in a network device, with an SFP module to be plugged into the port and with the SFP module including a physical layer module, a management interface coupled to the physical layer module and to a storage device holding ID information, and with a host including a media access control (MAC) module and a management interface, with the SFP physical layer module and MAC coupled by a serial interface and with the management interface of the host coupled to the management interface of the SFP, said method comprising the steps of:
at the host:
reading the storage device to access the ID information on the SFP;
configuring the MAC to communicate to the SFP module over the serial link utilizing the serial gigabit media independent interface (SGMII) protocol if the ID information indicates that the SFP physical layer module utilizes the 1000Base-T protocol as its media dependent interface protocol;
configuring the MAC to communicate to the SFP module over the serial link utilizing the serial 1000Base-X protocol if the ID information indicates that the SFP physical layer module utilizes the 1000Base-X protocol as its media dependent interface protocol;
at the SFP:
translating between the 1000Base-X and 1000Base-T protocols if the host communicates with the physical layer module over the serial interface utilizing the 1000Base-X protocol;
performing auto-negotiation with a device at the other end of a link to select a data transfer rate and communicating a negotiated data transfer rate to the MAC if the host communicates with the physical layer module utilizing the SGMII interface protocol.

6. A method for expanding the functionality of an optical gigabit SFP port in a network device, with an SFP module to be plugged into the port and with the SFP module including a physical layer module, a management interface coupled to the physical layer module and to a storage device holding ID information, and with a host including a media access control (MAC) module and a management interface, with the SFP physical layer module and MAC coupled by a serial interface and with the management interface of the host coupled to the management interface of the SFP, said method comprising the steps of:
at the host:
reading the storage device to access the ID information on the SFP;
configuring the MAC to communicate to the SFP module over the serial link utilizing a first protocol capable of transferring data at different data transfer rates if the ID information indicates that the SFP physical layer module utilizes a third protocol capable of transferring data at said different transfer rates over copper links as its media dependent interface protocol;
configuring the MAC to communicate to the SFP module over the serial link utilizing a second protocol only capable of transferring data at a single data transfer rate over an optical link if the ID information indicates that the SFP module physical layer module utilizes the second protocol as its media dependent interface protocol;
at the SFP:
translating between the second protocol and third protocol if the host communicates with the physical layer module over the serial interface utilizing the second protocol;
performing auto-negotiation with a device at the other end of a link to select a data transfer rate and communicating a negotiated data transfer rate to the MAC if the host communicates with the physical layer module utilizing the first protocol.

7. A method for expanding the functionality of an optical gigabit SFP port in a network device, with an SFP module designed to be plugged into the port and with the SFP module including a physical layer module, a management interface coupled to the physical layer module and to a storage device holding ID information and with a host including a media access control (MAC) module and a management interface, with the SFP physical layer module designed to be coupled to the MAC and having triple-speed 1000Base-T as its media dependent interface, and with the management interface of the SFP module designed to be coupled to the management interface of the MAC, said method, performed at the SFP, comprising the steps of:
translating between the 1000Base-X and 1000Base-T protocols if a host communicates with the physical layer module over the serial interface utilizing the 1000Base-X protocol;
performing auto-negotiation with a device at the other end of a link to select a data transfer rate and communicating a negotiated data transfer rate to the MAC if a host communicates with the physical layer module utilizing the SGMII interface protocol.

8. A method for expanding the functionality of an optical gigabit SFP port in a network device, with an SFP module designed to be plugged into the port and with the SFP module including a physical layer module, a management interface coupled to the physical layer module and to a storage device holding ID information and with a host including a media access control (MAC) module and a management interface, with the SFP physical layer module designed to be coupled to the MAC and having a first media dependent protocol capable of transferring data at different speeds over copper media, and with the management interface of the SFP module designed to be coupled to the management interface of the MAC, said method, performed at the SFP, comprising the steps of:
translating between a second protocol capable of transferring data over optical media at a single data transfer rate and a first protocol if the host communicates with the physical layer module over the serial interface utilizing the second protocol;
performing auto-negotiation with a device at the other end of a link to select a data transfer rate and communicating a negotiated data transfer rate to the MAC if the host communicates with the physical layer module utilizing the third protocol capable of transferring data at the different data rates.

9. A system for expanding the functionality of an optical gigabit SFP port in a network device, with an SFP module to be plugged into the port and with the SFP module including a physical layer module, a management interface coupled to the physical layer module and to a storage device holding ID information, and with a host including a media access control (MAC) module and a management interface, with the SFP physical layer module and MAC coupled by a serial interface and with the management interface of the host coupled to the management interface of the SFP, said system comprising:
means, at the host, for reading the storage device to access the ID information on the SFP;
means, at the host, for configuring the MAC to communicate to the SFP module over the serial link utilizing the serial gigabit media independent interface (SGMII) protocol if the ID information indicates that the SFP physical layer module utilizes the 1000Base-T protocol as its media dependent interface protocol;
means, at the host, for configuring the MAC to communicate to the SFP module over the serial link utilizing the serial 1000Base-X protocol if the ID information indicates that the SFP physical layer module utilizes the 1000Base-X protocol as its media dependent interface protocol;
means, at the SFP, for translating between the 1000Base-X and 1000Base-T protocols if the host communicates with the physical layer module over the serial interface utilizing the 1000Base-X protocol;
means, at the SFP, for performing auto-negotiation with a device at the other end of a link to select a data transfer rate and communicating a negotiated data transfer rate to the MAC if the host communicates with the physical layer module utilizing the SGMII interface protocol.

10. A system for expanding the functionality of an optical gigabit SFP port in a network device, with an SFP module to be plugged into the port and with the SFP module including a physical layer module, a management interface coupled to the physical layer module and to a storage device holding ID information, and with a host including a media access control (MAC) module and a management interface, with the SFP physical layer module and MAC coupled by a serial interface and with the management interface of the host coupled to the management interface of the SFP, said system comprising:
means, at the host, for reading the storage device to access the ID information on the SFP;
means, at the host, for configuring the MAC to communicate to the SFP module over the serial link utilizing a first protocol capable of transferring data at different data transfer rates if the ID information indicates that the SFP physical layer module utilizes a third protocol capable of transferring data at said different transfer rates over copper links as its media dependent interface protocol;
means, at the host, for configuring the MAC to communicate to the SFP module over the serial link utilizing a second protocol only capable of transferring data at a single data transfer rate over an optical link if the ID information indicates that the SFP physical layer module utilizes the second protocol as its media dependent interface protocol;
means, at the SFP, for translating between the second protocol and third protocol if the host communicates with the physical layer module over the serial interface utilizing the second protocol;
means, at the SFP, for performing auto-negotiation with a device at the other end of a link to select a data transfer rate and communicating a negotiated data transfer rate to the MAC if the host communicates with the physical layer module utilizing the first protocol.

11. An SFP module for expanding the functionality of an optical gigabit SFP port in a network device, with the SFP module designed to be plugged into the port and with the SFP module including a physical layer module, a management interface coupled to the physical layer module and to a storage device holding ID information and with a host including a media access control (MAC) module and a management interface, with the SFP physical layer module designed to be coupled to the MAC and having triple-speed 1000Base-T as its media dependent interface, and with the management interface of the SFP module designed to be coupled to the management interface of the MAC, said SFP module comprising:
means for translating between the 1000Base-X and 1000Base-T protocols if a host communicates with the physical layer module over the serial interface utilizing the 1000Base-X protocol; and
means for performing auto-negotiation with a device at the other end of a link to select a data transfer rate and communicating a negotiated data transfer rate to the MAC if a host communicates with the physical layer module utilizing the SGMII interface protocol.

12. An SFP module for expanding the functionality of an optical gigabit SFP port in a network device, with an SFP module designed to be plugged into the port and with the SFP module including a physical layer module, a management interface coupled to the physical layer module and to a storage device holding ID information and with a host including a media access control (MAC) module and a management interface, with the SFP physical layer module designed to be coupled to the MAC and having a first media dependent protocol capable of transferring data at different speeds over copper media, and with the management interface of the SFP module designed to be coupled to the management interface of the MAC, said SFP module comprising:

means for translating between a second protocol capable of transferring data over optical media at a single data transfer rate and a first protocol if the host communicates with the physical layer module over the serial interface utilizing the second protocol; and means for performing auto-negotiation with a device at the other end of a link to select a data transfer rate and communicating a negotiated data transfer rate to the MAC if the host communicates with the physical layer module utilizing the third protocol capable of transferring data at the different data rates.

\* \* \* \* \*